United States Patent
Hiramoto et al.

(10) Patent No.: US 7,018,148 B2
(45) Date of Patent: Mar. 28, 2006

(54) MACHINE TOOL

(75) Inventors: Kazuyuki Hiramoto, Yamatokoriyama (JP); Akihiro Mochizuki, Yamatokoriyama (JP); Shunsuke Nakazawa, Yamatokoriyama (JP); Satoshi Matsui, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/891,498

(22) Filed: Jul. 15, 2004

(65) Prior Publication Data
US 2005/0031426 A1  Feb. 10, 2005

(30) Foreign Application Priority Data
Jul. 15, 2003  (JP) ............................ 2003-197390

(51) Int. Cl.
*B23C 1/00* (2006.01)
(52) U.S. Cl. ...................... 409/134; 409/137; 409/235; 408/234; 408/241 G
(58) Field of Classification Search ................ 409/134, 409/137, 235, 165, 241; 408/234, 241 G, 408/236, 237, 56, 61, 91; 29/DIG. 50, DIG. 56, 29/DIG. 63, DIG. 101
See application file for complete search history.

(56) References Cited

U.S. PATENT DOCUMENTS

| | | | | |
|---|---|---|---|---|
| 5,181,898 A | * | 1/1993 | Piotrowski | 409/134 |
| 5,263,800 A | * | 11/1993 | Chen | 409/137 |
| 6,082,939 A | * | 7/2000 | Nakashima et al. | 409/134 |
| 6,641,341 B1 | * | 11/2003 | Sato et al. | 409/137 |
| 6,880,214 B1 | * | 4/2005 | Studemann et al. | 409/134 |

FOREIGN PATENT DOCUMENTS

JP  63-62636 A  3/1988

* cited by examiner

*Primary Examiner*—Boyer D. Ashley
*Assistant Examiner*—Dana Ross
(74) *Attorney, Agent, or Firm*—Smith Patent Office

(57) ABSTRACT

The present invention provides a machine tool capable of enhancing chip discharge efficiency and improving work efficiency with improved approachability to a spindle. A machine tool according to the present invention is structured such that a recession 2c with a back face side and an upper face side thereof opened is formed at a center portion of a bed 2, Y-axis guide rails 18 and Y-axis ball screws (drive shafts) 16 for guiding and driving the saddle 4 are disposed on right and left saddle supports (edges) 2b of the recession 2c and are covered with right and left Y-axis cutting covers 56, the right and left Y-axis cutting covers 56 are formed in an inclined shape with the recession 2c side thereof becoming lower, and a chip receptor 48 for discharging chips dropped into the recession 2c to a back face side of the bed 2 is disposed in the recession 2c.

4 Claims, 7 Drawing Sheets

FRONT OF MACHINE

MACHINE TOOL

BACKGROUND OF THE INVENTION

1. Filed of the Invention

The present invention relates to a machine tool that machines a workpiece while moving a vertically set spindle and the workpiece relatively to each other in X-axis, Y-axis, and Z-axis directions.

2. Discussion of the Prior Art

For example, a vertical machining center is generally structured, as shown in FIG. 7, to include: a column 61 fixedly disposed on a back end of a fixed bed 60 when seen from a front side of the machine; a saddle 62, for placing a workpiece W thereon, disposed on a front part of the fixed bed 60 to be movable in a Y-axis (forward and backward) direction; a table 63 disposed on the saddle 62 to be movable in an X-axis (right and left) direction; and a spindle head 65, with a spindle 64 attached thereto, disposed on a front face of the column 61 to be movable in a Z-axis (vertical) direction (see, for example, Japanese Patent Application Laid-open No. Sho 63-62636).

In some machining center as described above, a Y-axis drive shaft (not shown) of the saddle 62 is disposed between right and left saddle guide rails 71, 71 provided on a top face of the fixed bed 60. In such a machining center, chip disposal is performed in such a manner that the Y-axis drive shaft is surrounded by a chevron-shaped protector and a cutting fluid and chips are dropped to right and left sides of the bed along right and left slanted face of the protector to be discharged out of the machine.

SUMMARY OF THE INVENTION

The conventional structure of the above-described conventional machine in which the Y-axis drive shaft disposed on a center portion of the bed is surrounded by the chevron-shaped protector poses a concern about low chip discharge efficiency since the chips and so on dropped along the right and left slanted faces of the protector are collected outside the machine from the right and left sides of the bed. It also has a problem of poor approachability to a spindle by an operator due to the obstruction by the protector, resulting in lowered work efficiency of maintenance or the like.

In view of the above-described conventional circumstances, it is an object of the present invention to provide a machine tool that is capable of enhancing chip discharge efficiency and improving work efficiency with improved approachability to a spindle.

In a first invention, a machine tool includes: a bed; a saddle disposed on the bed to be movable in a forward and backward (Y-axis) direction in a front view of the machine; a table disposed on the saddle to be movable in a right and left (X-axis) direction; a column fixed on the bed; a spindle head disposed on a front face of the column to support a spindle and movable in a vertical (Z-axis) direction; a recession formed at a center portion of the bed with back, front, upper face sides thereof being opened; Y-axis guide rails extending along right and left edges of the recession and guiding the saddle; Y-axis drive shafts extending along the right and left edges of the recession and driving the saddle; right and left Y-axis cutting covers covering the Y-axis guide rails and the Y-axis drive shafts and formed in an inclined shape with the recession sides thereof being lower; and a chip receptor disposed in the recession and discharging chips dropped inside the right and left Y-axis cutting covers to a front side or a back side of the bed.

In this invention, the recession is formed at the center portion of the bed, the Y-axis guide rails and the Y-axis drive shafts extend along the right and left edges of the recession and are covered with the right and left Y-axis cutting covers, the right and left Y-axis cutting covers are formed in the inclined shape with the recession sides thereof being lower, and the chip receptor is provided in the recession. With this structure, it is possible to collectively discharge chips in such a manner that chips dropped along the right and left Y-axis cutting covers are collected in the receptor and the receptor is drawn out to the front side or the back side of the bed. This structure can enhance chip discharge efficiency compared with the conventional structure of discharging chips separately to the right and left sides of the bed.

Further, since the Y-axis guide rails and the Y-axis drive shafts extend along the right and left edges of the recession of the bed, a center portion of the recession is opened in the forward and backward direction. This can realize easy approachability to the spindle from the front side of the machine tool to improve work efficiency of maintenance.

In a preferable embodiment of the first invention, the chip receptor has a chip disposal mechanism therein for continuously discharging the chips dropped in the receptor.

In the embodiment described above, since the chip disposal mechanism for continuously discharging chips is provided in the chip receptor, automatic continuous chip disposal is realized by providing, for example, a conveyor in the receptor.

In another preferable embodiment of the first invention, the machine tool further includes: an X-axis guide rail disposed on the saddle and guiding the table, an X-axis drive shaft disposed on the saddle driving the table; and an X-axis cutting cover covering the X-axis guide rail and the X-axis drive shaft, and having right and left ends fixed to the right and left Y-axis cutting covers.

In the above-described embodiment, the X-axis guide rail and the X-axis drive shaft are covered with the X-axis cutting cover, and the right and left ends of the X-axis cutting cover are fixed to the Y-axis cutting cover, so that it is possible to surely prevent chips from getting in the X-axis cutting cover.

BRIEF DESCRIPTION OF THE DRAWINGS

The structure, operation, and effect of the present invention will be detailed in an embodiment based on the following attached drawings.

DETAILED DESCRIPTION OF THE PREFERRED EMBODIMENTS

Hereinafter, an embodiment of the present invention will be described based on the attached drawings.

Figure 1:
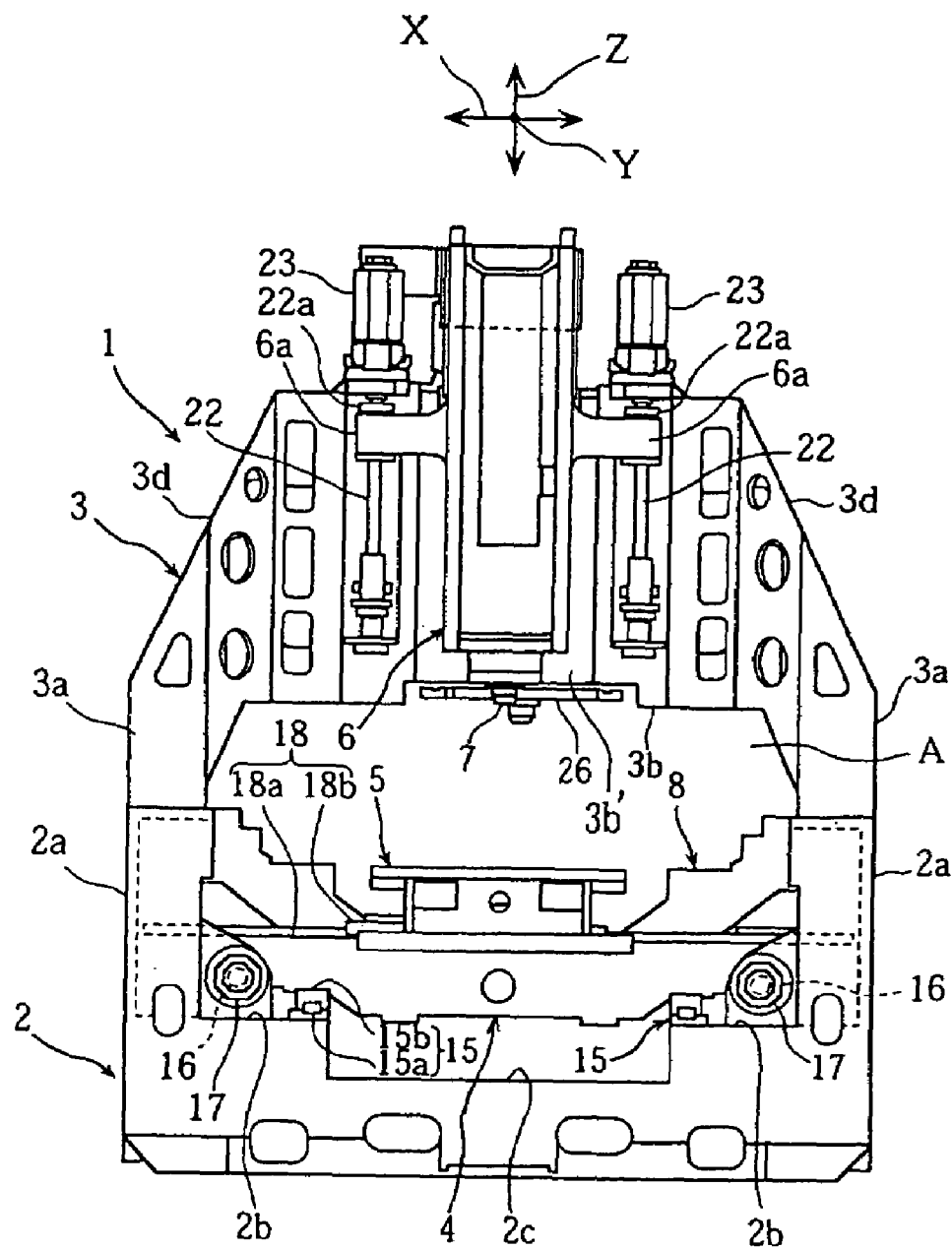
FIG. 1 is a front view to explain a vertical machining center according to an embodiment of the present invention.
Figure 2:
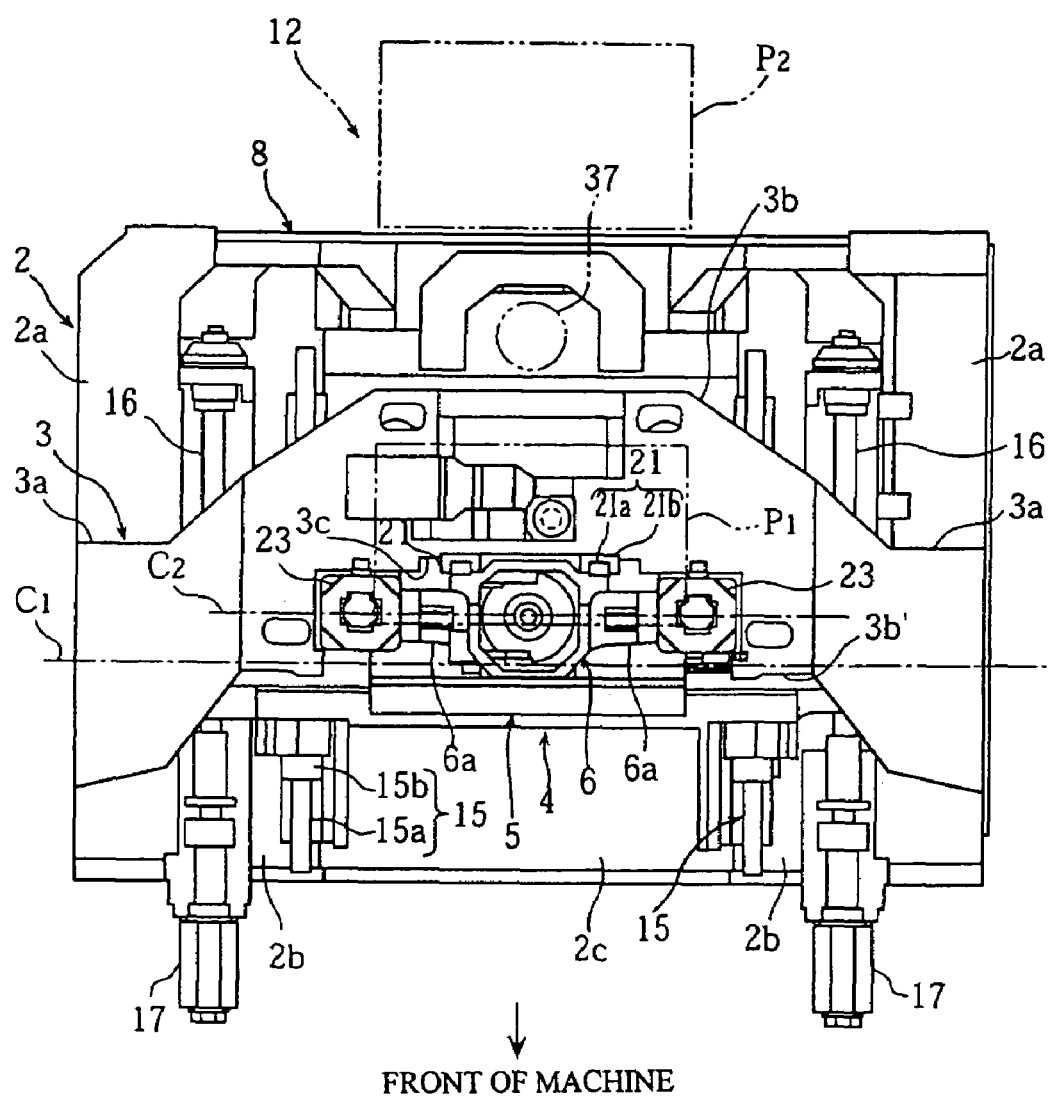
FIG. 2 is a plane view of the vertical machining center.
Figure 3:
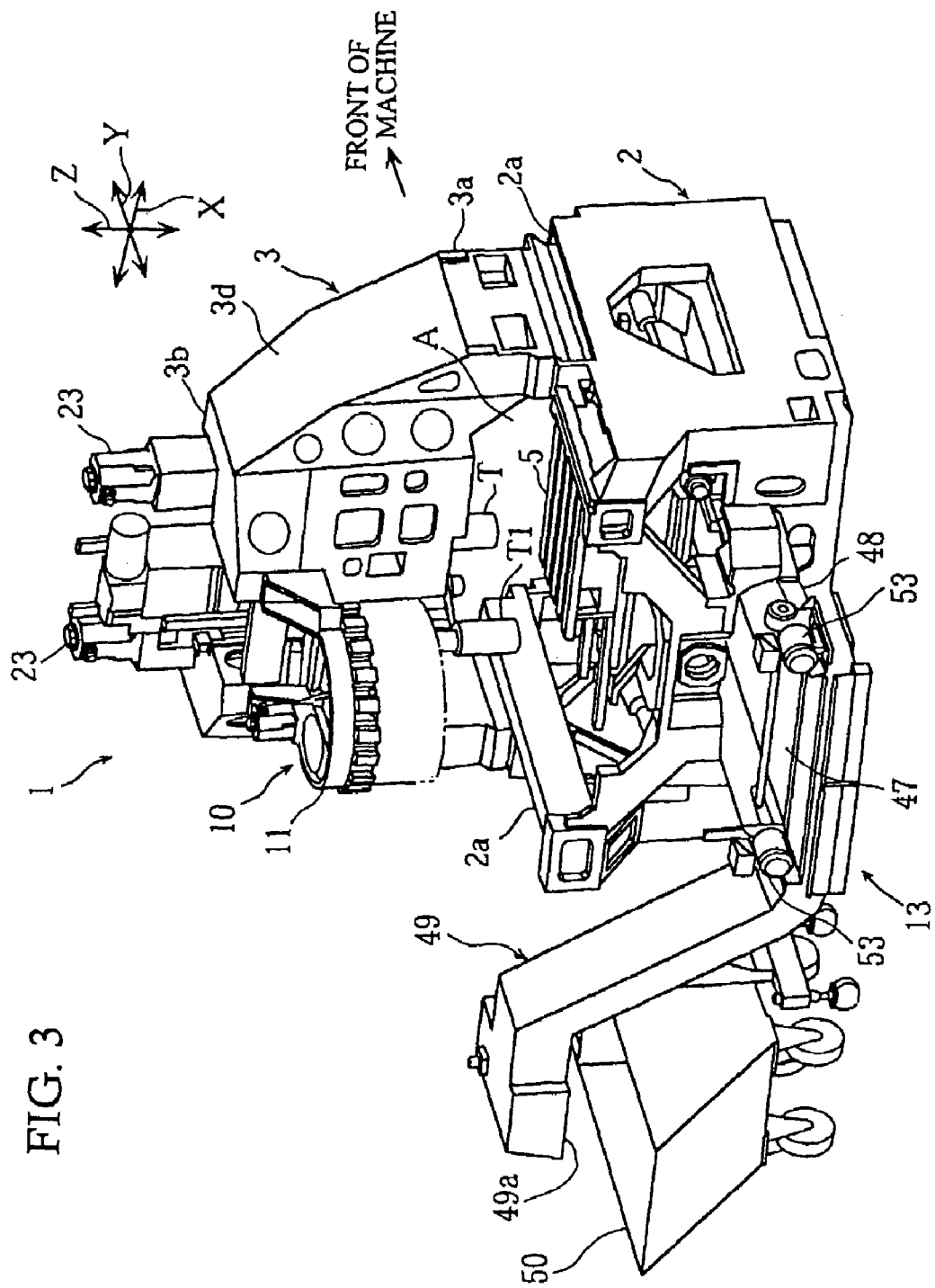
FIG. 3 is a rear perspective view of the vertical machining center.
Figure 4:
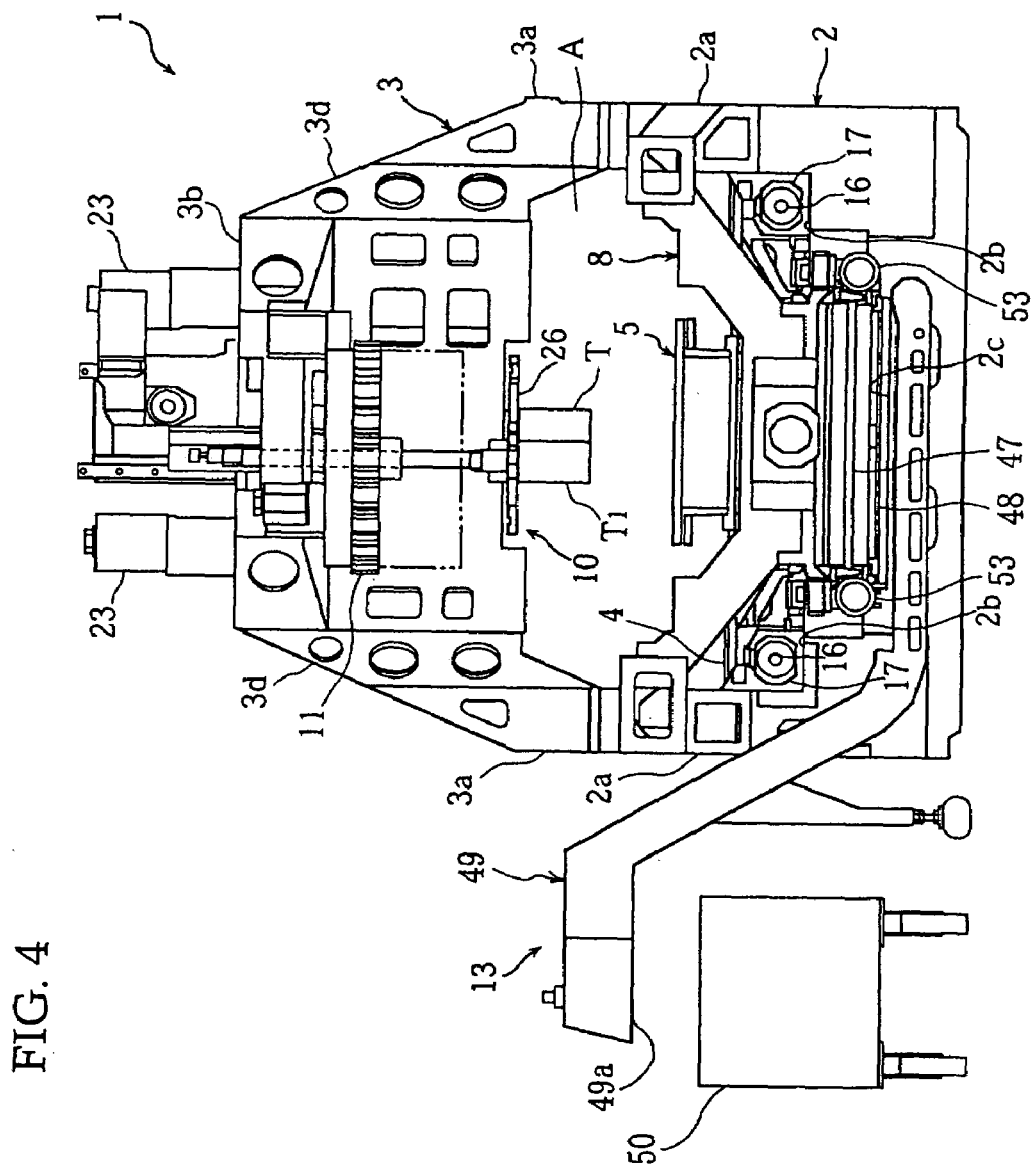
FIG. 4 is a rear view of the vertical machining center.
Figure 5:
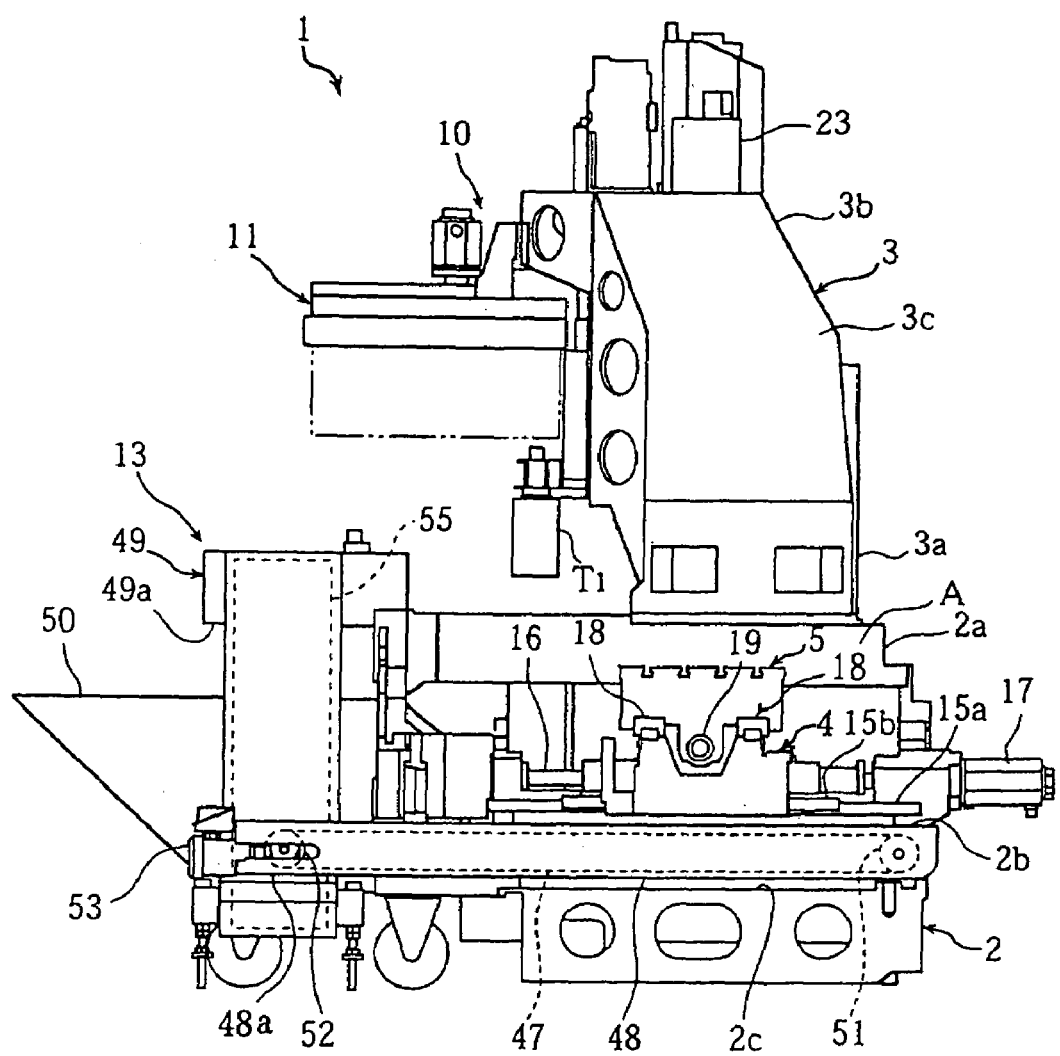
FIG. 5 is a left side view of the vertical machining center.
Figure 6:
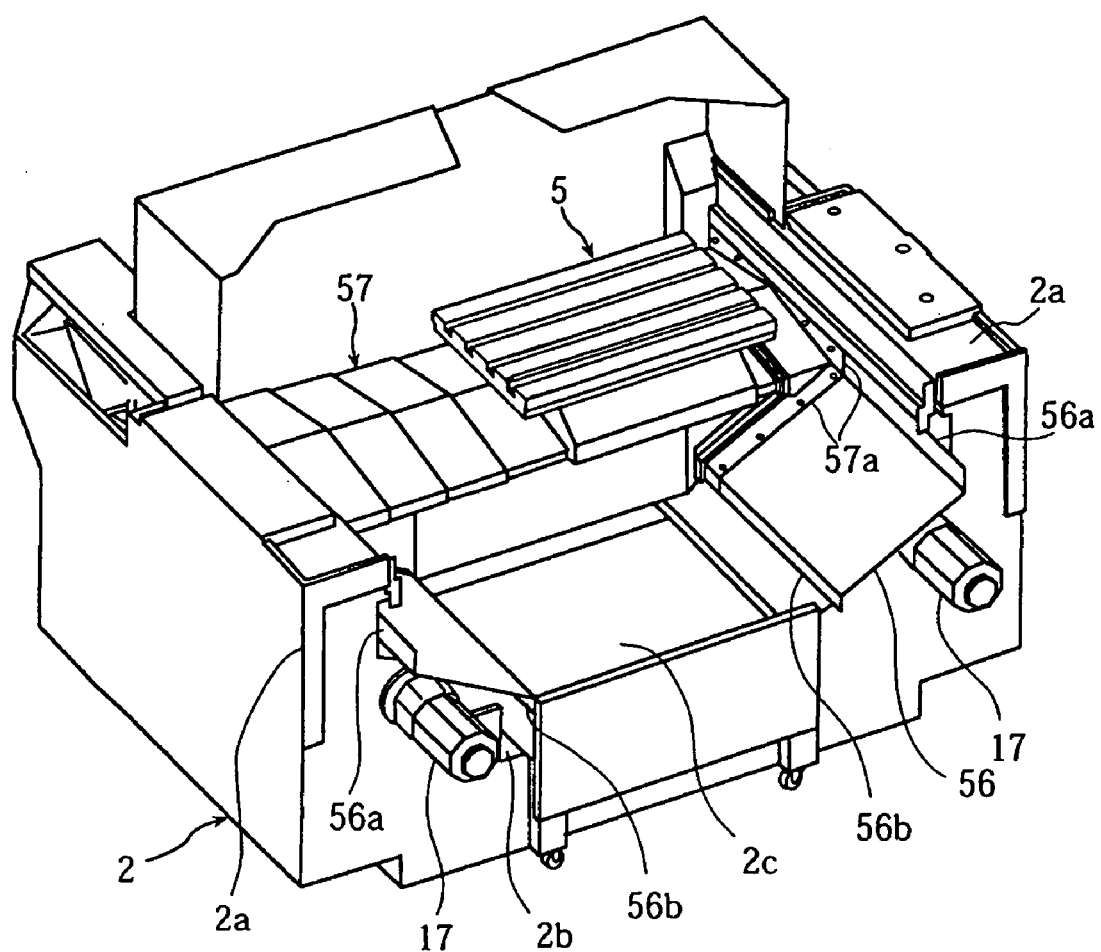
FIG. 6 is a front perspective view of a fixed bed of the vertical machining center.
Figure 7:
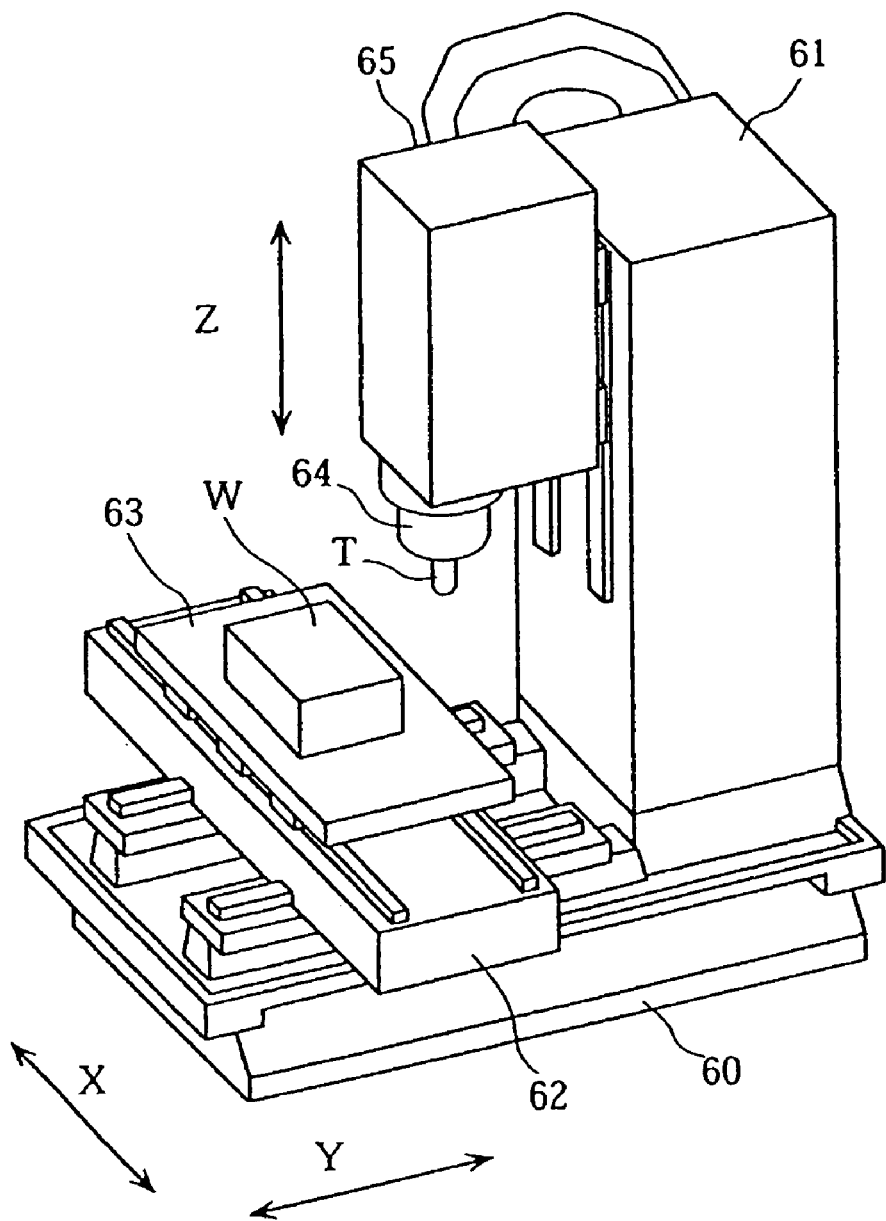
FIG. 7 is a schematic view of a typical vertical machining center according to a conventional art.

FIG. 1 to FIG. 6 are views to explain a vertical machining center (machine tool) according to an embodiment of the present invention. FIG. 1 and FIG. 2 are a front view and a plane view of the vertical machining center respectively, and FIG. 3, FIG. 4, and FIG. 5 are a rear perspective view, a rear view, and a left side view respectively of the vertical machining center including a chip disposer, and FIG. 6 is a front perspective view of a fixed bed.

In the drawings, a vertical machining center 1 includes: a gate-shaped column 3 fixed on substantially a center portion of a fixed bed 2 in terms of a forward and backward direction in a front view of the machine; a saddle 4 disposed under the column 3 to be movable in a Y-axis (forward and backward) direction; a table 5 disposed on the saddle 4 to be movable in an X-axis (right and left) direction; and a spindle head 6 disposed on a front face of the column 3 to be movable in a Z-axis (vertical) direction. A spindle 7 is rotatably supported by a lower end of the spindle head 6 and a tool T is detachably attached to the spindle 7.

In the vertical machining center 1 described above, a workpiece (not shown) placed on the table 5 is cut by the tool T while the workpiece and the spindle 7 are moved relatively to each other, the workpiece moving in the X-axis and Y-axis directions and the spindle 7 moving in the Z-axis direction.

A tool changer 10 for automatically replacing a preceding working tool T attached to the spindle 7 by a subsequent working tool T1 attached to a tool magazine 11 through an opening A under the column 3 by means of a change arm 26 is mounted on a back face side of the column 3.

Under the column 3 on a back face side of the fixed bed 2, mounted is a workpiece changer 12 that automatically replaces via a turn shaft 37 a preceding process pallet P1 on which a machined workpiece is placed by a subsequent process pallet P2 on which a subsequently machined workpiece is placed.

The fixed bed 2 includes right and left vertical walls 2a, 2a, saddle supports 2b, 2b formed in a stepped shape inside the right and left vertical walls 2a, and a substantially flat bottomed recession 2c stepped down from the right and left saddle supports 2b. This bottomed recession 2c is positioned at a center portion of the bed 2 in terms of the X-axis direction with a back face side and an upper face side thereof opened. The right and left vertical walls 2a on the back face side of the fixed bed 2 are coupled to each other with a cross member 8.

Right and left Y-axis guide rails 15 supportingly guiding the saddle 4 in the Y-axis direction extend along inner edges of the right and left saddle supports 2b. Each of the Y-axis guide rails 15 includes a rail 15a fixed to the saddle support 2b and a guide 15b fixed to a bottom face of the saddle 4, the rail 15a and the guide 15b being slidably fitted to each other.

Further, right and left Y-axis ball screws 16, 16 for driving the movement of the saddle 4 in the Y-axis direction are rotatably fixed to outer sides of the respective Y-axis guide rails 15 on the right and left saddle supports 2b, and Y-axis drive motors 17, 17 for driving the rotation of the ball screws 16 are connected to front ends of the respective Y-axis ball screws 16.

A pair of front and back X-axis guide rails 18, 18 for supportingly guiding the table 5 in the X-axis direction are disposed on a top face of the saddle 4. Each of the X-axis guide rails 18 includes a rail 18a fixed to the saddle 4 and a guide 18b fixed to a bottom face of the table 5, the rail 18a and the guide 18b being slidably fitted to each other.

Between the front and back X-axis guide rails 18 on the top face of the saddle 4, one X-axis ball screw 19 for driving the movement of the table 5 in the X-axis direction is rotatably fixed, and an X-axis drive motor 20 for driving the rotation of the ball screw 19 is connected to a left end of the X-axis ball screw 19.

A pair of right and left Z-axis guide rails 21, 21 for supportingly guiding the spindle head 6 in the Z-axis direction is disposed on the front face of the column 3. Each of the Z-axis guide rails 21 includes a rail 21a fixed to a back face of the spindle head 6 and a guide 21b fixed to the front face of the column 3, the rail 21a and the guide 21b being slidably fitted to each other.

Right and left Z-axis ball screws 22, 22 for driving the movement of the spindle head 6 in the Z-axis direction is rotatably fixed on outer sides of the respective Z-axis guide rails 21 on the front face of the column 3, and Z-axis drive motors 23, 23 for driving the rotation of the ball screws 22 are connected to upper ends of the respective Z-axis ball screws 22.

The spindle head 6 has arms 6a, 6a extending in the right and left directions, and nuts 22a fitted to the Z-axis ball screws 22 are attached to the right and left arms 6a.

The column 3 is formed integrally by casting and has a shape of a gate that is bridged over an X-axis and Y-axis travel range of the table 5 in a front view of the machine and has right and left legs 3a, 3a and a beam 3b integrally connecting tops of the right and left legs 3a. The right and left legs 3a are fixed on top faces of the right and left vertical walls 2a of the fixed bed 2. In this structure, an opening A which is opened in the Y-axis direction and whose width in the X-axis direction is wide is formed under the column 3.

In a front view of the machine, the right and left legs 3a are inclined so that upper portions 3d of the legs 3a are positioned closer to the spindle head 6 and form a substantially triangular shape with the spindle head 6 side having larger vertical dimension. Further, the beam 3b is formed in a square shape with an upper edge and an open lower edge thereof being substantially parallel to each other.

In a plane view of the machine, the column 3 is formed in a substantially arch shape so that the beam 3b is displaced from the right and left legs 3a, 3a toward the back face side of the machine, and a front face 3b' of the beam 3b substantially coincides with a leg center line C1 passing through the centers of the right and left legs 3a in terms of the forward and backward direction. Further, the beam 3b is positioned at a center of the fixed bed 2 in terms of the Y-axis direction, and the right and left legs 3a are positioned at a front side thereof. A housing recession 3c for housing the spindle head 6 and the right and left Z-axis ball screws 22 is formed on the front face 3b' of the beam 3b. This eliminates the overhang of the spindle head 6 from the column 3.

A chip disposer 13 that collects a cutting fluid supplied to a workpiece machining portion and collects chips produced by the workpiece machining is disposed in the bottomed recession 2c of the fixed bed 2. The chip disposer 13 has the following structure.

A chip receptor 48 made of sheet metal with an upper side and a back side being opened is inserted in the bottomed recession 2c of the fixed bed 2, and a back end 48a of the receptor 48 extends from a back face of the fixed bed 2 to the outside of the machine. Further, a coolant tank 49 extending upward and inclined to the right side is communicatingly connected to a lower part of the back end 48a of the receptor 48, and a chip collecting bucket 50 is disposed under an upper end opening 49a of the coolant tank 49.

A conveyor 47 is disposed in the receptor 48, and rollers 51, 52 are disposed at front and back ends of the conveyor 47. The back-side roller 52 is coupled to a rotation motor 53 that drives the rotation of the conveyor 47. The conveyor 47 is in an endless belt plate shape formed of a large number of strip plates coupled by hinges. Further, a similar conveyor 55 is disposed in the coolant tank 49.

As shown in FIG. 6, the right and left Y-axis guide rails 15 and Y-axis ball screws 16 disposed on the saddle supports 2a of the fixed bed 2 are covered with Y-axis cutting covers 56, 56 extending over substantially the entire length thereof. The right and left Y-axis cutting covers 56 are inclined inward with the recession 2c side thereof becoming lower. Upper edges 56a of the cutting covers 56 are slidable along inner faces of the vertical walls 2a, and lower edges 56b thereof are slidable along upper edges of the recession 2c.

An X-axis cutting cover 57 covering all the faces except the table 5 is disposed on the saddler 4 under the table 5 and it covers the X-axis guide rails 18 and the X-axis ball screw 19. The X-axis cutting cover 57 is in a bellows shape expanding/contracting in accordance with the X-axis direction movement of the table 5, and right and left ends 57a, 57a of the X-axis cutting cover 57 are fixed to the Y-axis cutting covers 56.

Chips produced during machining and a cutting fluid supplied to a workpiece machining portion partly drop onto the conveyor 47 in the chip receptor 48 from the X-axis cutting cover 57 and the right and left Y-axis cutting covers 56 to be collected in the collecting bucket 50 by the conveyors 47, 55, and the cutting fluid is collected outside the machine from the receptor 48 through the conveyor 47.

According to this embodiment, the bottomed recession 2c with the back face side and the upper side opened is formed at the center portion of the fixed bed 2, the Y-axis guide rails 15 and the Y-axis ball screws 16 are disposed on the right and left saddle supports 2b of the bottomed recession 2c, and the right and left Y-axis cutting covers 56, 56 covering the Y-axis guide rails 15 and the Y-axis ball screws 16 are disposed to be inclined inward with the recession 2c side thereof becoming lower. Therefore, the chips dropped along the right and left Y-axis cutting covers 56 are collected in the conveyor 47 in the receptor 48 disposed in the bottomed recession 2c, so that the conveyor 47 can collectively discharge the chips out of the machine. This structure can enhance chip discharge efficiency compared with that of the conventional structure of separately discharging chips to the right and left sides.

Moreover, since the Y-axis guide rails 15 and the Y-axis ball screws 16 are disposed on the right and left saddle supports 2b of the bottomed recession 2c in the fixed bed 2, the center portion of the bottomed recession 2c is opened in the forward and backward direction. This facilitates approaching the spindle 7 from the front side of the machine, which can improve work efficiency of maintenance.

In this embodiment, the X-axis guide rails 18 and the X-axis ball screw 19 disposed on the top face of the saddle 4 are covered with the X-axis cutting cover 57, and the right and left ends 57a of the X-axis cutting cover 57 are fixed to the Y-axis cutting cover 56, which can surely prevent chips from getting in the X-axis cutting cover 57.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

The invention claimed is:

1. A machine tool comprising:
    a bed;
    a saddle disposed on said bed to be movable in a forward and backward (Y-axis) direction in a front view of the machine;
    a table disposed on said saddle to be movable in a right and left (X-axis) direction;
    a column fixed on said bed;
    a spindle head disposed on a front face of said column to support a spindle and movable in a vertical (Z-axis) direction;
    a recession formed at a center portion of said bed with back, front, and upper face sides thereof being opened;
    Y-axis guide rails extending along right and left edges of said recession and guiding said saddle;
    Y-axis drive shafts extending along the right and left edges of said recession and driving said saddle;
    right and left Y-axis cutting covers covering said Y-axis guide rails and said Y-axis drive shafts and formed in an inclined shape with said recession sides thereof being lower; and
    a chip receptor disposed in said recession and discharging chips dropped inside said right and left Y-axis cutting covers to a front side or a back side of said bed.

2. The machine tool according to claim 1,
    wherein said chip receptor has a chip disposal mechanism therein for continuously discharging the chips dropped in said receptor.

3. The machine tool according to claim 2, further comprising:
    an X-axis guide rail disposed on said saddle and guiding said table;
    an X-axis drive shaft disposed on said saddle and driving said table; and
    an X-axis cutting cover covering said X-axis guide rail and said X-axis drive shaft and having right and left ends fixed to said right and left Y-axis cutting covers.

4. The machine tool according to claim 1, further comprising:
    an X-axis guide rail disposed on said saddle and guiding said table;
    an X-axis drive shaft disposed on said saddle and driving said table; and
    an X-axis cutting cover covering said X-axis guide rail and said X-axis drive shaft and having right and left ends fixed to said right and left Y-axis cutting covers.

\* \* \* \* \*